(12) United States Patent
Lin et al.

(10) Patent No.: US 7,720,808 B2
(45) Date of Patent: May 18, 2010

(54) APPARATUS AND METHOD FOR GENERATING REPORTS FROM A SHARED LIST OF PARAMETERS

(75) Inventors: Tao Lin, Port Coquitlam (CA); Timothy John Lawrence, North Vancouver (CA)

(73) Assignee: Business Objects Software Ltd., Dublin (IE)

( * ) Notice: Subject to any disclaimer, the term of this patent is extended or adjusted under 35 U.S.C. 154(b) by 286 days.

(21) Appl. No.: 11/304,503

(22) Filed: Dec. 14, 2005

(65) Prior Publication Data

US 2007/0143332 A1    Jun. 21, 2007

(51) Int. Cl.
  *G06F 17/30* (2006.01)
(52) U.S. Cl. .................. 707/603; 707/600; 707/602
(58) Field of Classification Search .............. 707/104.1, 707/3, 2, 102
See application file for complete search history.

(56) References Cited

U.S. PATENT DOCUMENTS

| | | | |
|---|---|---|---|
| 2002/0116210 A1* | 8/2002 | Medina et al. | 705/1 |
| 2003/0220941 A1* | 11/2003 | Arnold et al. | 707/200 |
| 2006/0069628 A1* | 3/2006 | Le et al. | 705/28 |
| 2006/0294088 A1* | 12/2006 | Stecher et al. | 707/4 |

OTHER PUBLICATIONS

U.S. Appl. No. 10/954,641, filed Sep. 29, 2004, Weiliang Le, et al.

* cited by examiner

*Primary Examiner*—John E Breene
*Assistant Examiner*—Tu-Nguyet Le
(74) *Attorney, Agent, or Firm*—Cooley Godward Kronish LLP

(57) ABSTRACT

A computer readable medium comprises executable instructions to form a list of parameters for a report. The list of parameters is compared to existing lists of parameters. A selected list of parameters is designated. A report is generated with the selected list of parameters.

8 Claims, 4 Drawing Sheets

APPARATUS AND METHOD FOR GENERATING REPORTS FROM A SHARED LIST OF PARAMETERS

BRIEF DESCRIPTION OF THE INVENTION

This invention relates generally to data storage and retrieval. More particularly, this invention relates to generating data reports from a shared list of parameters.

BACKGROUND OF THE INVENTION

Business Intelligence (BI) generally refers to software tools used to improve business enterprise decision-making. These tools are commonly applied to financial, human resource, marketing, sales, customer and supplier analyses. More specifically, these tools can include: reporting and analysis tools to present information; content delivery infrastructure systems for delivery and management of reports and analytics; data warehousing systems for cleansing and consolidating information from disparate sources; and, data management systems, such as relational databases or On Line Analytic Processing (OLAP) systems used to collect, store, and manage raw data.

There are a number of commercially available products to produce reports from stored data. For instance, Business Objects Americas of San Jose, Calif., sells a number of widely used report generation products, including Crystal Reports™, Business Objects OLAP Intelligence™, Business Objects Web Intelligence™, and Business Objects Enterprise™. As used herein, the term report refers to information automatically retrieved (i.e., in response to computer executable instructions) from a data source (e.g., a database, a data warehouse, and the like), where the information is structured in accordance with a report schema that specifies the form in which the information should be presented. A non-report is an electronic document that is constructed without the automatic retrieval (i.e., in response to computer executable instructions) of information from a data source. Examples of non-report electronic documents include typical business application documents, such as a word processor document, a spreadsheet document, a presentation document, and the like. Report generators, such as the commercially available products listed above, include executable code to produce a report.

Prompts may be used when generating a report. A prompt is a variable used to retrieve a value specified by a user. A prompt is typically used with a set of prompts in a hierarchy. For example, a report may have a query definition that retrieves world wide sales data. A prompt can be specified so that only data for a specific geographic region, for example Chicago, is displayed when the report is generated. Prompts are frequently structured in a hierarchy. For example, geography related prompts may specify a country, state, and city. This hierarchy of prompts is separate from the underlying data and does not include the specific data from the underlying data source within its definition. For example, in the case of hierarchical prompts based on geography, a match between two hierarchies of prompts is not dependent on the underlying data sources containing consistent data values for country, state or city Hierarchies of prompts can be both managed and unmanaged. Managed hierarchies of prompts are processed in a managed environment, while unmanaged hierarchies of prompts exist almost anywhere, such as in a report. An unmanaged hierarchy of prompts is static. On the other hand, a managed hierarchy of prompts can be periodically updated and populated by the managed environment.

When a report is imported into a managed environment a list of prompts associated with the report may be created. If a report is imported into the system more than once, multiple lists of prompts are created—one for each imported report that contains a hierarchy of prompts. This is true even if the hierarchy of prompts has not changed. Thus, as shown in FIG. 1, a system may simultaneously manage a set of reports (e.g., Report_1 through Report_N) and corresponding lists of prompts (e.g., List of Prompts_1 through List of Prompts_N). The overhead for the creation and maintenance of such objects can be expensive, affecting the performance and scalability of the system.

In view of the foregoing, it would be desirable to provide an improved technique for generating reports. In particular, it would be desirable to provide a technique for generating a list of prompts that could be shared by many reports.

SUMMARY OF THE INVENTION

The invention includes a computer readable medium with executable instructions to form a list of parameters for a report. The list of parameters is compared to existing lists of parameters. A selected list of parameters is designated. A report is generated with the selected list of parameters.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
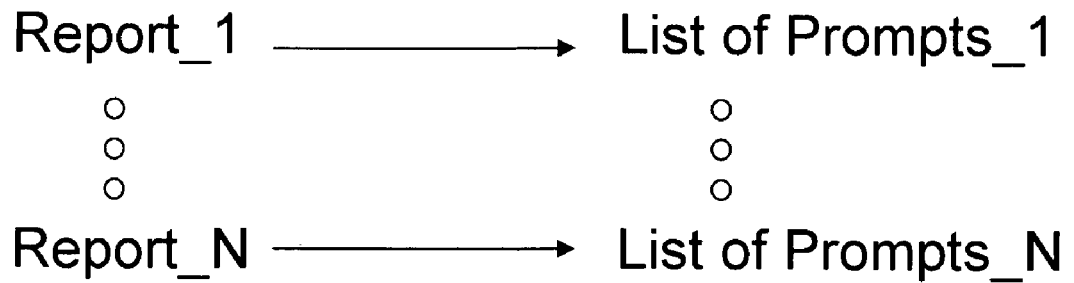
FIG. 1 illustrates a prior art technique for linking reports with corresponding lists of prompts.
Figure 2:
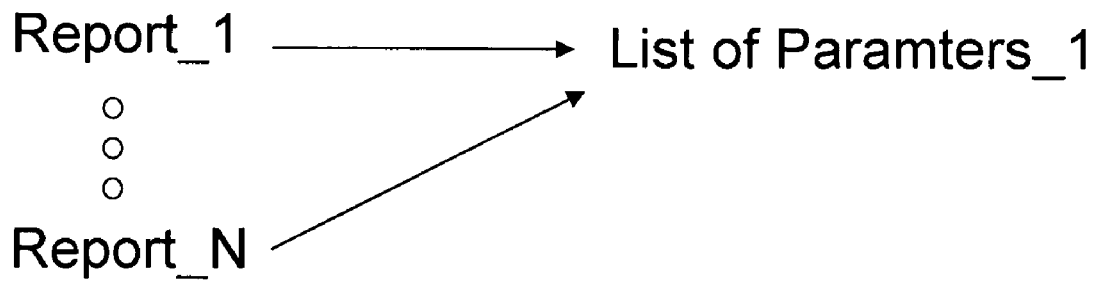
FIG. 2 illustrates a technique for linking a set of reports with a shared list of parameters in accordance with an embodiment of the invention.

FIG. 2 is a conceptual illustration of a technique of the invention. In particular, the figure illustrates a set of reports (Report_1 through Report_N) sharing a common list of parameters (List of Parameters_1). As used herein, a list of parameters refers to a combination of a query definition and a set of prompts. A query definition comprises elements that a report uses to acquire and refresh its data. These elements may include database connections, tables, joins, and other components that define how data is fetched. As discussed above, a prompt is a variable used to retrieve a value specified by a user. The invention forms a list of parameters by combining a query definition and prompts in order to reduce the overhead associated with managing multiple lists of prompts. The reduced overhead is achieved through the reuse of a list of parameters. This reuse of a list of parameters improves system performance and scalability.

Figure 3:
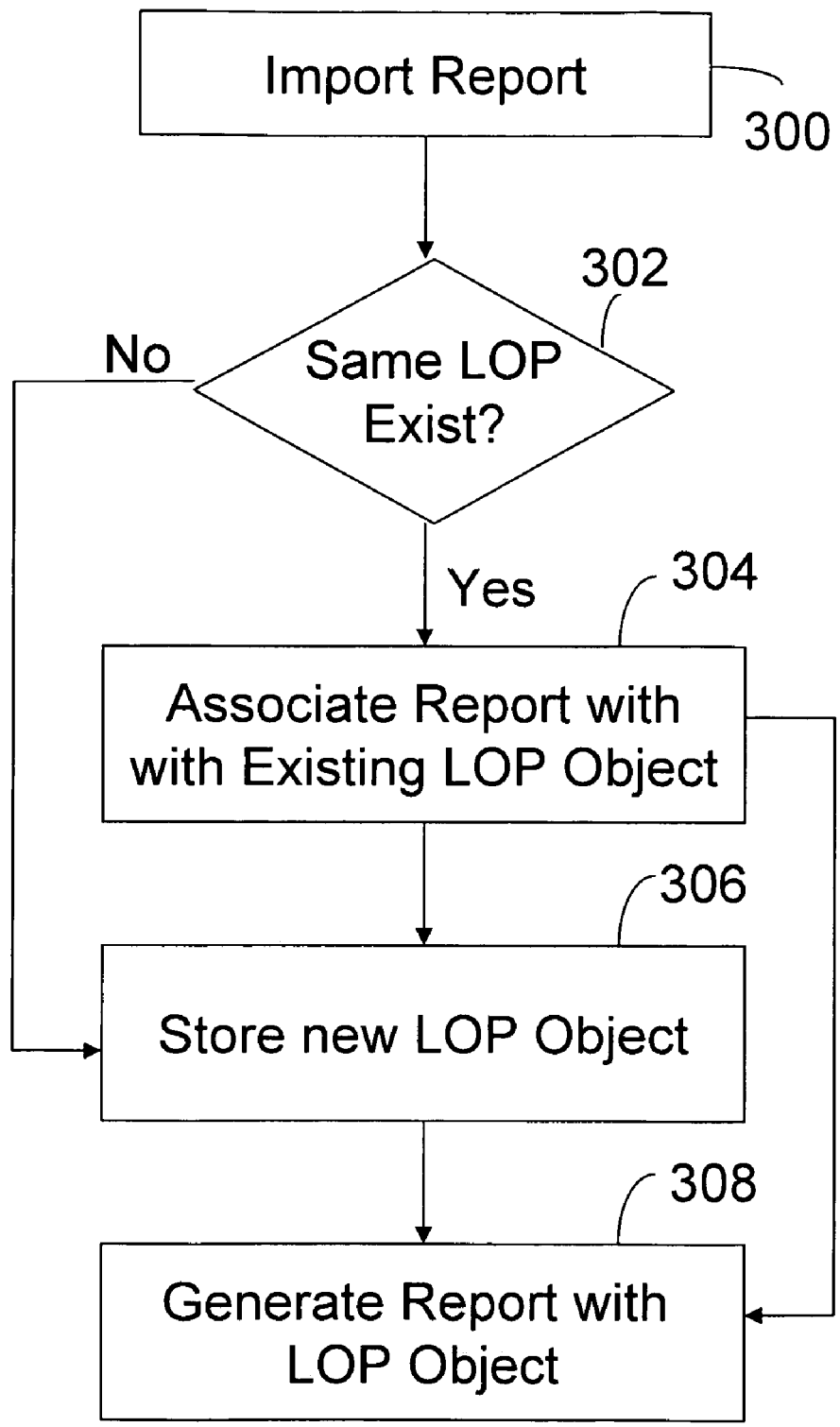
FIG. 3 illustrates processing operations associated with an embodiment of the invention.

FIG. 3 illustrates processing operations associated with an embodiment of the invention. Initially, a report is imported 300. Next, it is determined whether the same list of parameters (LOP) associated with the report already exists within the system 302. If so, the existing list of parameters is associated with the new report 304, for example, by using a pointer between the new report and the existing list of parameters. If the list of parameters associated with the new report does not exist, then this new list of parameters is stored for future reference 306. In either event, a report is generated using a list of parameters object (i.e., either a new list of parameters or a shared list of parameters).

Figure 4:
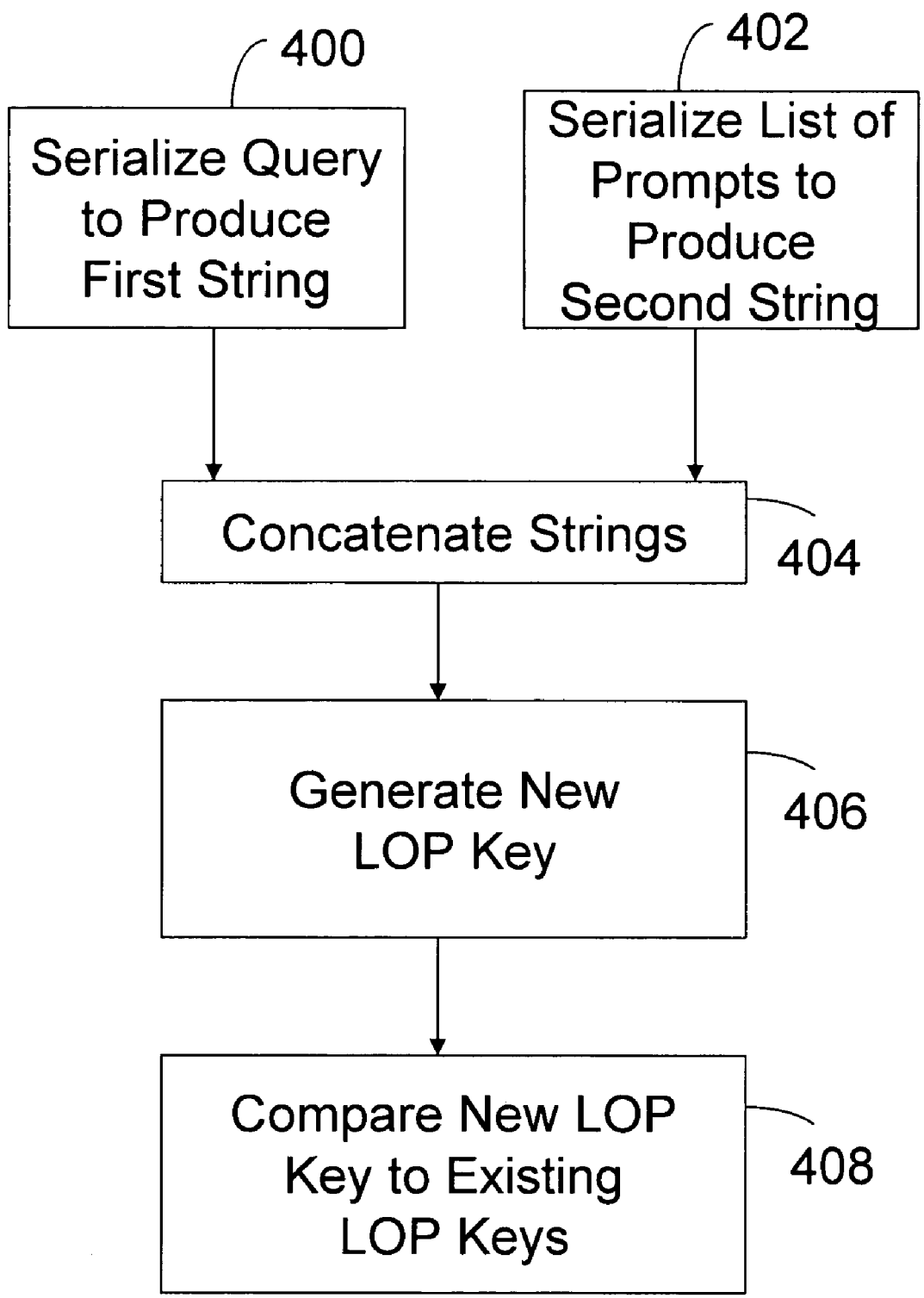
FIG. 4 illustrates a key generation technique utilized in accordance with an embodiment of the invention.

Any number of techniques may be used to implement the operation of block 302 of FIG. 3. That is, any number of techniques may be used to compare a new list of parameters with existing lists of parameters. FIG. 4 illustrates one such technique. In accordance with the technique of FIG. 4, the query associated with the report is serialized to produce a first string 400. In addition, the list of prompts associated with the report is serialized to produce a second string 402. The strings are then concatenated 404. The concatenated string is then used to generate a new list of parameters key 406. For example, the concatenated string may be applied to an encryption algorithm to produce the new list of parameters key. The final operation of FIG. 4 is to compare the new list of parameters key to existing list of parameters keys 408. In this example, the comparison of keys may be efficiently performed using any number of known key comparison techniques. To facilitate this process, in one embodiment, the keys are indexed.

Other techniques may be used to implement the operation of block 302. For example, in another embodiment of the invention, a first key is generated from the query and a second key is generated from the list of prompts. The first and second key are then concatenated to generate a new list of parameters key.

The encryption operation can be implemented using enciphering or hashing techniques. Hashing is a process in which an input string of arbitrary length is mapped to a hash output string of a fixed length. The hash output string is typically shorter than the input string, but may be longer or the same length. Enciphering is the process of replacing an input string (e.g., a text string) with cipher text. The cipher text contains all of the information of the plain text, but it is not in an understandable format without the proper mechanism to decipher it.

The lists of parameters objects may be compared explicitly to identify duplicate objects. While this approach is workable, it is more costly and is not as scalable as the utilization of keys described above. The key generation technique described above is efficient and scalable, particularly if the keys are indexed.

The operations of the invention are more fully appreciated in connection with the following example. A report "Sales Report" is imported into a report generating system. A unique key (e.g., Key A) is generated from a combination of the query definition of the "Sales Report" and the hierarchy of prompts associated with the sales report. In this example, assume that the hierarchy of prompts includes the elements country, state and city. The system searches for Key A in its list of keys and does not find it. The system stores a list of parameters object (LOP Object A), which represents the query definition of "Sales Report" and the hierarchy of prompts associated with the sales report. Key A is embedded within the LOP Object A.

Next, the report "Revenue Growth" is imported into the system. Associated with "Revenue Growth" is a hierarchy of prompts with the elements continent and country. A unique key (Key B) is generated from a combination of the query definition of "Revenue Growth" and the report's hierarchy of prompts. The system searches for the Key B in its list of keys, but does not find it. The system stores a list of parameters object (LOP Object B), which represents the query definition of "Revenue Growth" and the hierarchy of prompts associated with the report. Key B is embedded within LOP Object B.

At this point, a third report "Sales Department Hiring" is imported into the system that contains the same hierarchical prompt elements (country, state, city) and query definition as the report "Sales Report." A unique key (Key C) is generated. Since the query definition and hierarchy of prompt elements of "Sales Report" and "Sales Department Hiring" are identical, Key C matches Key A. The system identifies Key A embedded in LOP Object A. The system then associates LOP Object A with the report "Sales Department Hiring" allowing the report to utilize or otherwise share the existing list of parameters associated with LOP Object A. Likewise, if a report is re-imported into the managed environment and its hierarchical prompt elements and query definition have not been modified, the key generated for this re-imported report will match the existing key within the managed system.

Figure 5:
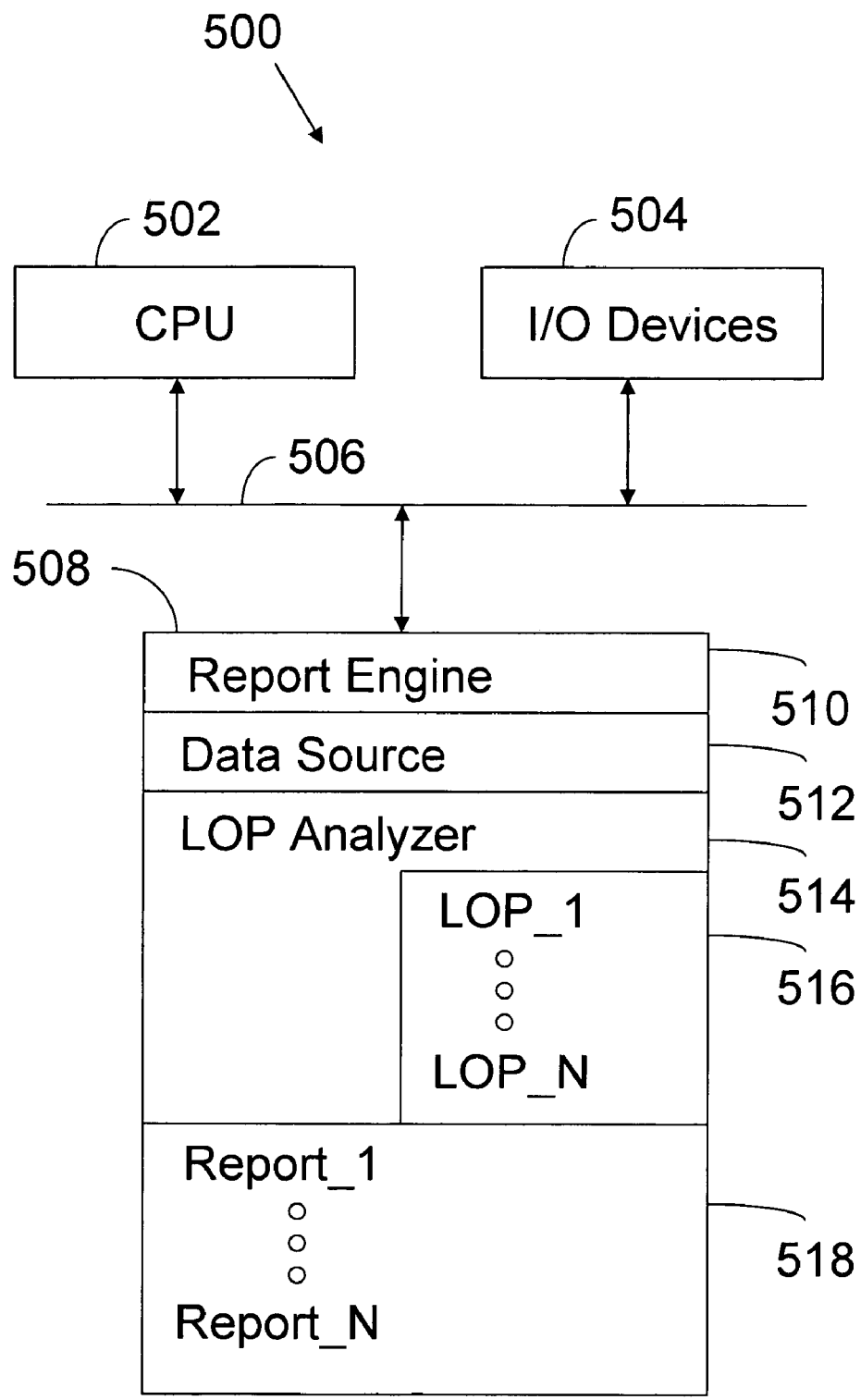
FIG. 5 illustrates a system configured in accordance with an embodiment of the invention.

FIG. 5 illustrates a system 500 configured in accordance with an embodiment of the invention. The system 500 includes a central processing unit 502 connected to a set of input and output devices 504 via a bus 506. The input and output devices may include a keyboard, mouse, monitor, and network connection circuitry, allowing the system 500 to operate as a client or server in a networked environment. Also connected to the bus 506 is a memory 508. The memory 508 stores a report engine 510, which accesses a data source (e.g., a database) 512 to produce reports. The report engine 510 includes or operates with a list of parameters analyzer 514. The list of parameters analyzer 514 includes executable instructions to implement the operations of the invention, such as those illustrated in FIGS. 3 and 4. As a result, the list of parameters analyzer generates shared lists of parameters 516. These shared lists of parameters are then used to generate reports 518.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable medium, comprising executable instructions to:

define a report generator;

establish a list of parameters analyzer operative with the report generator, the list of parameters analyzer including executable instructions to:

produce a list of parameters associated with a report, wherein the list of parameters is formed from a query and a list of prompts, wherein the report includes information automatically retrieved from a data source, where the information is structured in accordance with a report schema that specifies the form in which the information should be presented;

compare the list of parameters to shared existing lists of parameters, if the list of parameters does not exist in the shared existing lists of parameters, supplement the shared existing lists of parameters with the list of parameters, otherwise, if the list of parameters is already in the shared existing lists of parameters, do not alter the shared existing lists of parameters and thereby complete a comparison; and after the comparison, designate a selected list of parameters from the shared existing lists of parameters; wherein the report generator produces a report with the selected list of parameters.

2. The computer readable medium of claim 1 wherein the executable instructions to produce include executable instructions to produce a list of parameters key from the query and the list of prompts.

3. The computer readable medium of claim 2 wherein the executable instructions to produce include executable instructions to produce the list of parameters key from a concatenated query string and a list of prompts string.

4. The computer readable medium of claim 2 wherein the executable instructions to produce include executable instructions to produce the list of parameters key from a first key segment corresponding to the query and a second key segment corresponding to the list of prompts.

5. The computer readable medium of claim 2 wherein the executable instructions to compare include executable instructions to compare the list of parameters key to existing lists of parameters keys.

6. The computer readable medium of claim 5 wherein the existing lists of parameters keys are indexed.

7. The computer readable medium of claim 2 wherein the executable instructions to designate include executable instructions to designate the list of parameters key as the selected list of parameters when the list of parameters key does not match the existing lists of parameters keys.

8. The computer readable medium of claim 2 wherein the executable instructions to designate include executable instructions to designate an existing list of parameters key as the selected list of parameters when the list of parameters key matches an existing list of parameters key.

* * * * *